F. B. KREULHAUS.
COTTON CHOPPER AND CULTIVATOR.
APPLICATION FILED MAR. 6, 1911.

997,623.

Patented July 11, 1911.

2 SHEETS—SHEET 1.

WITNESSES:
C. K. Davies
E. A. Jordan

INVENTOR
Ferdinand B. Kreulhaus

BY
Thomas R. Harvey
ATTORNEY

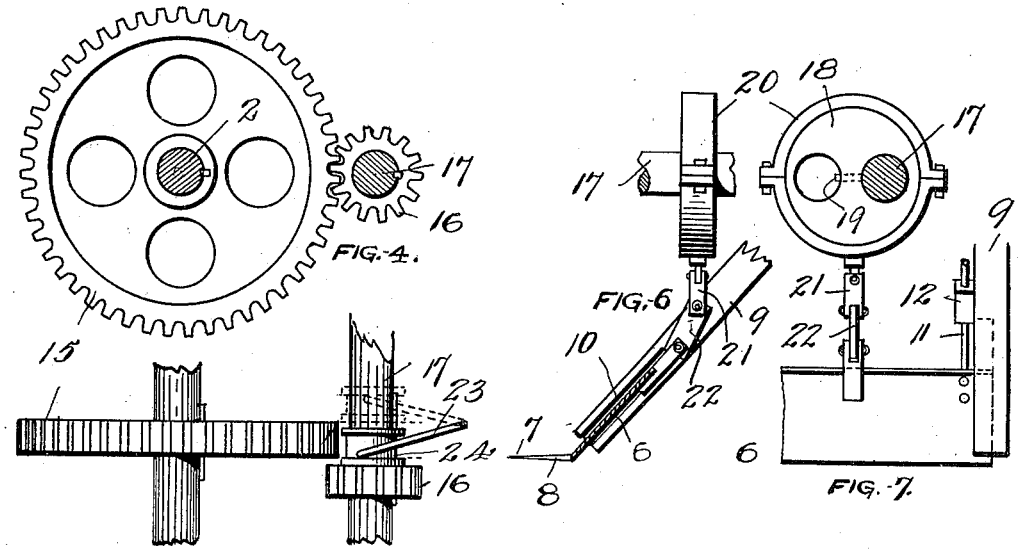

UNITED STATES PATENT OFFICE.

FERDINAND B. KREULHAUS, OF BIRMINGHAM, ALABAMA.

COTTON CHOPPER AND CULTIVATOR.

997,623. Specification of Letters Patent. Patented July 11, 1911.

Application filed March 6, 1911. Serial No. 612,519.

*To all whom it may concern:*

Be it known that I, FERDINAND B. KREULHAUS, a citizen of the United States, residing at 211 South Thirteenth street, Birmingham, in the county of Jefferson and State of Alabama, have invented certain new and useful Improvements in Cotton Choppers and Cultivators, of which the following is a specification.

This invention relates to improvements in cotton choppers and cultivators, and embodies novel means for chopping the tops of cotton stalks or plants. The implement is designed especially to accomplish this purpose in workmanlike manner, and utilizes a pair of co-acting and opposing knives, by means of which the undesirable cotton plants are chopped out of a row; and provision is of course made, whereby certain plants are left standing in the row that is being cultivated by the implement.

The invention consists in certain novel features of construction and arrangements of parts for performing the required functions, as will be hereinafter pointed out, and as illustrated in the accompanying drawings.

The drawings exemplify the best mode I have so far devised for the practical application of the principles of the invention, and illustrate an operative implement which has proven eminently satisfactory in its physical embodiment and actual service.

Figure 1:
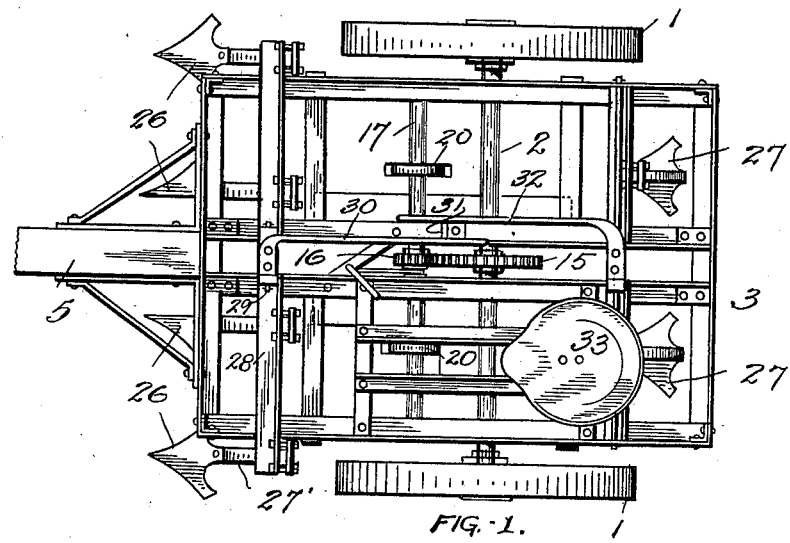
Figure 2:
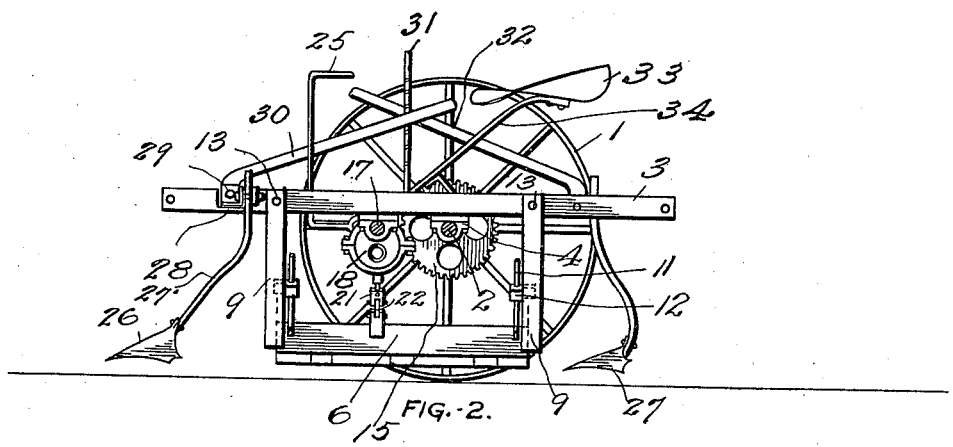

Figure 1 is a plan view of an implement embodying the novel features of my invention. Fig. 2 is a side elevation of the implement, with the "near" wheel removed. Fig. 3 is a rear view of the implement with some parts omitted for clearer illustration. Fig. 4 is an enlarged detail of the driving gears. Fig. 5 is a detail of the driving gears, showing the device for actuating the clutch. Fig. 6 shows the connections for actuating one of the knives, the knife blade being shown in section. Fig. 7 is a face view of one of the eccentrics and shows its connection with the knife blade, and Fig. 8 is a plan view of the two choppers or knives.

The implement is intended to be drawn by a pair of horses, and includes a pair of supporting wheels 1, 1, journaled upon the axle or shaft 2, the connection being rigid so that the wheels and shaft rotate together. A rectangular frame 3, preferably made up of angle irons, is supported at the bearings 4, upon the axle and this frame supports the various devices of the implement, a tongue 5 being provided for attachment of the horses.

The operation of chopping the cotton plants is accomplished through the medium of a pair of knives or choppers 6, 6. The edges 7, 7, of the blades of the knives are sharpened as illustrated, and are provided with alined recesses 8, extending a suitable distance in the blade portion of the knife. The knives are arranged to reciprocate toward and away from each other, and for this purpose are each suspended in a pair of bracket arms 9, 9, formed with grooves or recesses 10, 10 in which the blades are adapted to be guided. An additional guiding and bracing element is provided at each end of each knife blade, in the shape of a rod 11, 11, attached to the blade and movable through an opening in a guide block 12, attached to the bracket arm 9. The bracket arms 9 depend from the main frame of the implement, being attached at 13, by bolts or other fastening means. As clearly seen in Figs. 3 and 6 the brackets 9 are disposed at an angle, the pairs of brackets at each side of the implement extending downwardly and inwardly toward each other, and as clearly seen in Fig. 3, a brace or cross arm 14 is employed to give rigidity to the parts. The knives are caused to reciprocate through the forward movement of the vehicle or implement, and to accomplish this action I provide the large gear wheel 15 upon and rotatable with the axle or driving shaft 2. The wheel 15 meshes with a smaller pinion 16 rotatable with the counter shaft 17 journaled in the frame 1. The counter shaft carries a pair of eccentrics 18 rigidly secured thereto by means of a pin or key 19, and each eccentric is provided with the usual strap 20. The eccentric straps are connected to the respective knife blades by means of the loose links 21 and 22 which form a flexible connection between the parts. To throw the knives into or out of operative position I utilize the customary shifting fork 23, which is engaged with the spool 24 attached to the pinion 16, and may be actuated by means of the lever 25.

In connection with the cutting or chopping knives I also employ a number of cultivating plows. In the drawings I have illustrated four front plows indicated by the numerals 26 and two rear plows, 27. The front plows are each suspended by means of a shank 27' from the beam 28, and the beam is fulcrumed at 29 in the frame 1 of the implement, a lever 30 being provided for lifting the plows forwardly and upwardly out of operative position. The lever may be secured in adjusted position by means of the notched standard 31, as will be understood. The rear plows are also movable out of operative position by means of a second hand lever 32 which may be engaged in the notched standard. The rear plows are adapted to be lifted upwardly and rearwardly out of operative position. The usual seat for the operator is shown at 33 and is supported from the main frame by the bracket or arm 34.

From the above description taken in connection with the drawings it is believed the operation of the implement will be readily understood. With the gears on the driving and countershafts meshing the forward movement of the implement, as drawn by the horses, rotates the eccentrics. The action of the eccentrics, through their connections, moves the knife blades downwardly and toward each other, the cutting edges approaching and chopping off the plants between them. The recesses in the cutting knives leave a plant standing between them. The knives are reciprocated at each revolution of the eccentrics or cams and the implement progresses sufficiently during each reciprocation to bring the cutting knives in position to chop the next succeeding number of plants.

Having thus fully described my invention, what I claim as new and desire to secure by Letters Patent is:—

1. The combination in an implement as described, with the driving wheels, axle, countershaft and geared connections, of a pair of oppositely disposed co-acting independently supported knives adapted to reciprocate toward and from each other, guiding brackets for each knife, and connections from the countershaft for operating each knife.

2. The combination in an implement as described, with the wheels, axle, countershaft and geared connections, of a pair of oppositely disposed co-acting independently supported knives, and means actuated from the countershaft for reciprocating said knives each in a downward and inward direction.

3. The combination in an implement as described, of a pair of co-acting, reciprocable knives, angularly disposed recessed brackets for supporting each knife, and means operated from a moving part of the implement for actuating said knives in a downward and inward direction.

4. The combination of a pair of co-acting knives, angularly disposed recessed supporting brackets therefor, a counter-shaft, an eccentric on said shaft connected to each knife, guide blocks, and a rod at the end of each knife movable in said blocks.

5. The combination in an implement as described, of a pair of co-acting reciprocable knives each having a recessed cutting edge, angularly disposed grooved supporting brackets, guide blocks, a guide rod at the end of each knife movable in said blocks, a countershaft actuated from a moving part of the implement, eccentrics each having flexible connection with a knife, and means for rendering said knives inoperative.

In testimony whereof I affix my signature in presence of two witnesses.

FERDINAND B. KREULHAUS.

Witnesses:
  WILLIS W. BURT,
  J. F. WEISS.

---

Copies of this patent may be obtained for five cents each, by addressing the "Commissioner of Patents, Washington, D. C."